US012773372B2

(12) United States Patent
Wolf

(10) Patent No.: US 12,773,372 B2
(45) Date of Patent: Oct. 27, 2026

(54) SEALING FILM AND PACKAGING FOR GAS OR VAPOR DECONTAMINABLE PACKAGING APPLICATIONS

(71) Applicant: SCHOTT Pharma Schweiz AG, St. Gallen (CH)

(72) Inventor: Patrick Wolf, St. Gallen (CH)

(73) Assignee: SCHOTT PHARMA SCHWEIZ AG, St. Gallen (CH)

( * ) Notice: Subject to any disclaimer, the term of this patent is extended or adjusted under 35 U.S.C. 154(b) by 480 days.

(21) Appl. No.: 18/358,515

(22) Filed: Jul. 25, 2023

(65) Prior Publication Data

US 2024/0033181 A1 Feb. 1, 2024

(30) Foreign Application Priority Data

Jul. 28, 2022 (EP) .................................... 22187524

(51) Int. Cl.
*A61J 1/14* (2023.01)

(52) U.S. Cl.
CPC .................................. *A61J 1/1468* (2015.05)

(58) Field of Classification Search
CPC .......... A61J 1/1468; B32B 1/00; B32B 27/32; B32B 27/34; B32B 27/36; B32B 2250/02; B32B 2250/03; B32B 2250/04; B32B 2250/05; B32B 2250/20; B32B 2250/44; B32B 2262/0284; B32B 2270/00; B32B 2307/31; B32B 2307/7145; B32B 2307/724; B32B 2307/748; B32B 2435/02; B32B 2439/80; B32B 3/02; B32B 3/266; B32B 5/022; B32B 5/266; B32B 7/02; B32B 7/06; B32B 7/12; B32B 7/14;

(Continued)

(56) References Cited

U.S. PATENT DOCUMENTS

| | | | | |
|---|---|---|---|---|
| 2003/0183547 A1 | 10/2003 | Heyman | | |
| 2004/0224134 A1 * | 11/2004 | Trent | ...................... | B32B 23/08 428/189 |

(Continued)

FOREIGN PATENT DOCUMENTS

| | | |
|---|---|---|
| EP | 3782809 | 2/2021 |
| WO | 9419180 | 9/1994 |

OTHER PUBLICATIONS

English machine translation for JP2020-131436 (Year: 2020).*

(Continued)

*Primary Examiner* — Michael C Miggins

(74) *Attorney, Agent, or Firm* — Ruggiero McAllister & McMahon LLC

(57) ABSTRACT

A multi-layer sealing film has (a) a layer of a selectively permeable non-woven that is essentially impermeable to microorganisms and (b1) a first layer of film having one or more predefined cut-out regions within an area of the multi-layer sealing film that is to cover an opening of container, or (b2) a first layer of film that is essentially impermeable to a gas or vapor having a first needling, perforation and/or cut pattern within the area of the multi-layer sealing film that is to cover the opening. The layer of a selectively permeable non-woven (a) and the first layer of film (b1) or (b2) are bonded by a sealing seam configured and arranged at least partially subject to and non-overlapping with a sealing seam area for sealing the opening.

17 Claims, 3 Drawing Sheets

(58) Field of Classification Search
CPC ......... B32B 27/08; B32B 27/12; B32B 27/16; B65D 65/40; B65D 25/00; B65D 2565/381; B65D 77/2024; B08B 5/02; B08B 2230/01
See application file for complete search history.

(56) References Cited

U.S. PATENT DOCUMENTS

| | | | |
|---|---|---|---|
| 2011/0139650 | A1 | 6/2011 | Dworak |
| 2014/0079589 | A1 | 3/2014 | Landgrebe |

OTHER PUBLICATIONS

ASTM F1608-16, "Standard Test Method for Microbial Ranking of Porous Packaging Materials (Exposure Chamber Method)1", Jun. 2016.

English translation of DIN 55543-4, "Packaging test—Test methods for packaging films—Part 4: Determination of shrinkage of plastic films in a liquid bath", Mar. 2017, 8 pages.

English translation of DIN 55529, "Packing—Determination of the sealing seam strength of seals made of flexible packaging materials", Sep. 2012, 12 pages.

* cited by examiner

SEALING FILM AND PACKAGING FOR GAS OR VAPOR DECONTAMINABLE PACKAGING APPLICATIONS

CROSS-REFERENCE TO RELATED APPLICATIONS

This application claims priority under 35 U.S.C. § 119 to European Patent Application No. 22187524.8 filed Jul. 28, 2022, the entire contents of which is incorporated by reference herein.

BACKGROUND OF THE DISCLOSURE

1. Field of the Disclosure

The present disclosure relates to a multi-layer sealing film for gas or vapor decontaminable packaging applications including a container having an opening to be sealed with a film before decontamination and a packaging including the same. The multi-layer sealing film is particularly useful for sterile storage and transport of objects for medical, pharmaceutical or cosmetic uses, in particular for sterile pharmaceutical primary packaging means, like vials, ampules, syringes, and/or cartridges.

2. Description of Related Art

When creating packaging for sterile storage and transport of objects it is an essential requirement that the packaging is sterilizable and able to maintain the sterile atmosphere within the packaging. Particularly, for sterile pharmaceutical primary packaging means like vials, ampules, syringes, or cartridges, a typical packaging for the transport from a manufacturer of pharmaceutical primary packaging means to a pharmaceutical company using the same comprises a tub or tray holding a multitude of the primary packaging means which tub or tray is sealed with a non-woven. As a rule, the sealed tub or tray is then further enclosed in one or two bags. The non-woven is usually a flash spun plexifilamentary film-fibril structure made of high-density polyethylene, which is known under the trademark Tyvek® of the company DuPont, or a spunbonded very fine filaments non-woven.

Such selectively permeable non-wovens enable sterilization by means of gas or vapor, like ethylene oxide, steam, or hydrogen peroxide, after closing the packaging. Hence, also at least one wall of the outer enclosing bags comprises or consists of such a non-woven. While being permeable for the sterilizing gas or vapor, the selectively permeable non-woven is essentially impermeable for microbes and thus forms a microbial barrier. The majority of microbes cannot pass the non-woven filament structure. Depending on the type and density of the non-woven a different sterility assurance level can be achieved, but there is always some number of microbes getting through. Hence, these non-wovens should be called only essentially impermeable for microbes.

At the pharmaceutical company, the sterile primary packaging means are unpacked and filled under controlled, sterile conditions. This involves so-called disinfection and/or decontamination steps at the transition from higher to lower classified clean room classes. These can, for example, be a biological decontamination using e-beam, hydrogen peroxide or wiping with an alcohol solution. Before the tub or tray is transferred to the aseptic area where the Tyvek® or other non-woven sealing film is removed and the active pharmaceutical ingredient is filled into the primary packaging means, a further decontamination step takes place. This is necessary because the sterility of the outside of the tub or tray cannot be guaranteed.

In the context of the present disclosure, decontamination is defined as an umbrella term for reducing the number of microbes and biological agents, such as fungi, bacteria, viruses, spore forms, prions, unicellular eukaryotic organisms, etc. The special terms disinfection and sterilization differ in the amount of reduction of these. While disinfection only reduces the amount of said contaminants, sterilization effectively kills, deactivates, or eliminates all forms of life and other biological agents which are present, i.e. a reduction of 100%. Hence, disinfection is less effective than sterilization. The required level of reduction is determined by the intended application.

While the non-woven sealing film works well regarding the assurance of the sterility of the tub or tray, there exist particularly two problems which are up to date not yet satisfactorily solved.

The first problem relates to the sealing properties of the non-woven and its tear open behavior. In order to be sealable against the polymer of the tub or tray while maintaining the transit of the sterilizing medium, the non-wovens are usually dot coated with an adhesive. This adhesive layer results in a quite small sealing window which has to be met for full integrity of the sealing seam. Moreover, the sealing strength varies to a great extent with the amount the optimal sealing conditions are missed. As a consequence, the sealed non-woven may exhibit inter-layer failure during the opening process, i.e., the packaging does not open by separating the adhesive from the tub or tray but by tearing the non-woven apart. This is particularly undesirable because this way an increased amount of lint from the fibrils and filaments of the non-woven is generated which may contaminate the packaged items. Of course, this problem is even more severe with non-wovens not being provided with an adhesive layer at all.

The adhesive is also problematic as it limits the temperature range which can be used for steam sterilization. If the steam is too hot, the sealing seam may soften and fail. Moreover, during transport of the packaging, the non-sealed adhesive in the area covering the opening of the container may in consequence of the vibrations become scratched off the non-woven by the packaged items resting on it. The formed particles may also contaminate the packaged items. This problem is increasing with the age of the sealing film because aging tends to introduce brittleness to the adhesive.

Further, the adhesive coated non-wovens are often difficult to handle during the sealing process because of a tendency to build up electrostatic energy. However, the commonly employed anti-static additives must not be used for these films because they work by migrating to the surface of the polymer where they would contaminate the packaged items. In particular items used in the medical and pharmaceutical sector holding vaccines require extremely high purity levels and the absence of any contaminants and foreign matter and must meet regulated standards.

The second problem is related to the transport of vials and the like in the tubs or trays. In common practice, the vials are placed in the tubs or trays into separate pigeonholes and then the container is sealed with the non-woven. For sterilization and transport, the containers are then placed top-down into a transport rack, i.e. the vials rest with their full weight only on the non-woven. This may result in the non-woven sagging to a certain extent and the vials dropping out of their pigeonholes. In order to avoid this, the pigeonholes would have to be increased in height up to the upper rim of the container. However, this will not only require more material for the container, which in turn makes it more expensive and a lot heavier, but also result in problems when stacking the containers and when taking the vials out of the container by means of robotic grippers. Particularly when steam is used as the sterilization medium, this problem is even more enhanced.

SUMMARY OF THE DISCLOSURE

It is an object of the present disclosure to provide a multi-layer sealing film for gas or vapor decontaminable packaging applications including a container having an opening to be sealed with a film before decontamination which overcomes at least some of the drawbacks of the sealing films of the prior art.

In particular, it is one object to provide a multi-layer sealing film which has a broad temperature for the sealing process (commonly referred to as a broad sealing window). A further object is to provide a multi-layer sealing film which allows for a broad range of temperature for steam sterilization. Moreover, the sealing film should have a reduced tendency towards the formation of lint and particles, particularly during the de-lidding process of the packaging. Yet another object is the provision of a multi-layer sealing film which prevents the packaged items from falling out of the pigeonholes of the container while not impeding their automated detachment by means of robotic grippers.

As used herein, a "film" is to be understood to comprise not only solid polymer films but also layers of non-wovens or combinations thereof. The term is used as an interchangeable umbrella term for both types of polymer layers of the packaging.

As used herein, a "selectively permeable non-woven" is to be understood as being permeable for gases or vapors but being essentially impermeable for microbes and microorganisms and thus forming a microbial barrier. The term "essentially impermeable for microbes" within this context refers to a microbial barrier measured according to ASTM F1608-16 of 2-6 Log Reduction Value (LRV). In ASTM F1608, an aerosol of bacterial spores is sprayed on the porous packaging material inside the exposure chamber. Spores that pass through the material are collected on membrane filters and counted. The LRV, the ability of a packaging material to stop microorganisms, is calculated by comparing the logarithm of the number of spores passing through the porous material with the logarithm of the bacterial challenge. LRV is calculated by:

$$LRV=\log_{10}N_0-\log_{10}N_1,$$ where:

$N_0$=average bacterial challenge determined from the challenge control filter.

$N_1$=average number of bacteria passing through.

In a first aspect, the disclosure relates to a multi-layer sealing film for gas or vapor decontaminable packaging of a container having an opening to be sealed with the multi-layer sealing film before gas or vapor decontamination, the multi-layer sealing film consisting of or comprising, in a sequence from an outside towards an inside of the container (a) a layer of a selectively permeable non-woven that is essentially impermeable to microorganisms, and (b1) a first layer of film having one or more predefined cut-out regions within an area of the multi-layer sealing film that is to cover the opening of the container, or (b2) a first layer of film that is essentially impermeable to a gas or vapor of the gas or vapor decontamination, the first layer of film having a first needling, perforation and/or cut pattern within the area of the multi-layer sealing film that is to cover the opening of the container, wherein the layer of a selectively permeable non-woven (a) and the first layer of film (b1) or (b2) are bonded by a sealing seam which is configured and arranged at least partially subject to and non-overlapping with a sealing seam area for sealing the opening of the container.

The inventors have ascertained that a design of the multi-layer sealing film as a multi-layer film instead of the adhesive covered non-woven provides far superior results. Thus, advantageously the adhesive is replaced with a solid polymer film comprising one or more layers. This allows for a fine-tuning of the sealing properties in relation to different container materials, a well-defined opening mechanism, and the avoidance of the formation of particles and lint. In order to maintain the permeability of the non-woven for the sterilization medium, the film to be joined to the non-woven may have two different designs.

A first alternative, designated as (b1) above, uses a film having one or more window-like cut-out regions. These windows are positioned such way that they spare out an area above the opening of the container in order to allow the sterilization medium to enter the container, i.e. when fixed to the opening of the container, the non-woven layer is at least not fully covered by the impermeable film within the area of the opening. The cut-out region(s), each or together, should generally have a size as large as possible in order to allow unobstructed entry of the sterilization medium. However, smaller cut-outs may also be used if a little increased sterilization time is acceptable and/or the impermeable covering of at least a partial area is desired. For the sealing process, a small "frame" of film within the sealing area with the container opening is sufficient. Hence, a single cut-out region having almost the size of the opening of the container is preferred. There only has to be enough film area left for a sealing with the rim of the container, i.e. its sealing area around the opening, and a sealing seam for joining it with the non-woven.

There are two options proposed for arranging the sealing seam for joining the film with the non-woven, which also applies to the other alternative for the first layer of film (b2). It is essential that it is non-overlapping with the sealing seam area for sealing the opening of the container because then the sealing of the sealing film on the rim of the container would have to be made on the already existing sealing seam.

The sealing seam may be arranged within the area which is to cover the opening of the container. The sealing film may in this case be dimensioned like the opening if it is used as pre-cut sheets or on a roll with the same width as the container opening. The latter is to be preferred for automatic packaging. After being placed on the rim of the container, the sealing film is then sealed to it with a sealing seam which is just outside the contour of the sealing seam joining the film with the non-woven. This has the advantage that no sealing film extends over the contours of the container which might cause difficulties in handling the closed package and increase material costs.

In the alternative, the sealing seam for joining the film with the non-woven may be arranged just outside the area which is to cover the opening of the container. As a consequence, the sealing film has to be adequately larger sized than the container opening. The sealing seam fixing the sealing film on the sealing area of the container will then be positioned just inside the contour of the sealing seam joining the film with the non-woven.

If desired as a precautionary measure or if the non-sealed edge of the film causes jamming during the film positioning, the two alternatives may also be combined with an additional sealing seam around the contours of the cut-out region(s). This might be particularly useful for designs comprising more than one cut-out region or a cut-out region which is considerably smaller than the opening of the container. However, it is not necessary in other embodiments.

A second alternative, designated as (b2) above, uses a film being essentially impermeable for the decontaminating gas or vapor, having a first needling, perforation and/or cut pattern within the area of the sealing film which is to cover the opening of the container. The film will then cover the whole non-woven layer and allow the entry of the sterilization medium through its needling, perforation and/or cut pattern. Regarding the joining sealing seam between the film and the non-woven, the same as for the alternative (b1) applies, wherein an additional sealing seam around the cut-out regions is of course not applicable in this case.

In preferred embodiments, the multi-layer sealing film further comprises in sequence from outside towards inside of the packaging after the first layer (b2):

(c) an adhesive layer that is activated by an energy transmission and that (i) covers an entire surface of at least one of the layer of a selectively permeable non-woven (a) and the first layer of film (b1) or (b2) or (ii) is arranged in a pattern over a portion of or the entire surface, (d) a second layer of film that is essentially impermeable to the gas or vapor of the gas or vapor decontamination, the second layer of film having a second needling, perforation and/or cut pattern that is incongruent with the first needling, perforation and/or pattern.

With these additional layers, the multi-layer sealing film is able to provide the further function of a hermetic sealing of the container after sterilization. The hermetic sealing of the structure is effected by activation of the adhesive between the first layer of film and the second layer of film. It is important that the first and second needling, perforation and/or cut patterns are incongruent. This can either be achieved by using two different patterns or by using the same pattern but shifting the position. Preferably, there are no intersecting patterns between the two layers in order to avoid a direct linear path from outside to inside of the film. Patterns which have proven themselves to be useful for this purpose are, for example, labyrinth-like patterns, comb-like patterns, or sufficiently spaced apart stripe patterns.

Regarding the needling, perforation and/or cut patterns used in the two layers of film there exist various options for arranging them. They may be arranged over the whole surface of the films in an intermeshing style when viewed through the combined films, like described above. This has the advantage of very short paths to travel for the decontaminating gas or vapors between the two film layers and, hence, an increased breathability of the packaging. However, the mechanical strength of the film layers decreases with the density of the patterns. For this variant it is also possible to cover only limited areas of the films creating a window-like surface which allows the decontaminating gas and vapors to enter the package only in these predefined areas.

As an alternative, the needling, perforation and/or cut patterns may be arranged in separate areas of the combined film layers. For example, the patterns may be arranged in the first layer of film to cover only an area on the left side of the opening of the container and in the second layer of film to cover only an area on the right side of the opening of the container while the middle of the opening of the container contains no patterns at all.

Preferably, activation of the adhesive layer by energy transmission can be effected through heat, UV irradiation, IR irradiation, induction, and/or microwave irradiation. The type of energy transmission is selected to fit the type of adhesive. The adhesives may, for example, be a hot melt adhesive or a reactive system, like polyurethane or poly (meth)acrylate adhesives. Reactive systems usually have an additive, such as a photo initiator or a radical initiator, and can thus be activated by UV or IR radiation or heat. A system which can be activated by induction typically contains a nano-scaled ferromagnetic additive. Heat sealable adhesives can, for example, be based on ethylene-vinyl acetate copolymers or ionomers.

In a particularly preferred embodiment, the adhesive is a hot melt heat sealable adhesive system having additives which are responsive to energy transmission.

In an embodiment, the selectively permeable nonwoven is a flash spun plexifilamentary film-fibril structure or a spunbonded very fine filaments nonwoven. Preferably, the diameter of the very fine filaments is in either case in the range of 0.5-10 μm. One example of such a non-woven material is Tyvek® of the company DuPont. A particularly suitable type for this application is Tyvek® 1073B.

Preferably, the selectively permeable non-woven is made of high-density polyethylene (HDPE), polypropylene (PP), or polyethylene terephthalate (PET).

In preferred embodiments, the first layer of film (b1) or (b2) and/or the second layer of film (d) has/have monoaxial or biaxial heat shrink properties. Producing the film layers with shrink properties will help to counteract the sagging of the non-woven during sterilization and transport of the container in an upside-down position. Particularly when using steam as the sterilization fluid, this feature has a pronounced effect. The increased temperature of the steam allows for a broad selection of polymers and production parameters for the film. Moreover, the temperature of the steam is high enough to cause also a noticeable shrink of the commonly deep drawn trays which worsens the sagging of the multi-layer sealing film which has been sealed onto them before treatment. However, other sterilization media are also used at elevated temperatures which are sufficient to exceed the shrink initiation temperature. Hence, this option is not only applicable to steam sterilization. Apart from that it would also be possible to use a separate heating step, for example with an IR lamp or a common shrink tunnel, for initiation of the shrinking. Of course, the advantage of the multi-layer sealing film of this embodiment is more pronounced with steam since it does not require any additional steps.

In order to get the best results regarding the sagging, it may be beneficial to decrease the size of the cut-out region or to use several cut-out regions which spare areas which form a strap-like band between the transverse sides of the opening of the container. This assures that the shrinking film layer will exert enough forces to counteract the sagging and stabilize the packaged items.

In this context it is to be noted that the effect of the shrinking film layer acts independently from the sagging non-woven layer due to the fact that the multi-layer sealing films according to the disclosure are not a laminated structure fully bonded over their entire surface but only joined by sealing seams on their periphery and optionally around the window-like cut-outs. While the non-woven layer will still sag after the film layers have shrunk, the effect of the fixation of the packaged items is nevertheless restored. Hence, the design of the multi-layer sealing film is essential for this function. If the non-woven layer and the film layers were fully laminated, the achieved effect would be much smaller because the non-woven would impede the shrinkage of the film layers.

The shrink of the first layer of film (b1) or (b2) and/or the second layer of film (d) in one or both directions preferably is 20%-55%, more preferably 25%-50% or 30%-45% when determined according to DIN 55543-4:2017-03.

DIN 55543-4:2017-03 is a packaging test, particularly a test method for packing films, more particularly a test for determining shrinkage of plastic films in a liquid bath. Test specimens are immersed in a bath at a test temperature for a period time and thereafter removed. A shrinkage S is calculated by measuring an in initial length $L_o$ and final length $L_s$ of the specimen according to the equation:

$$S = \left(\frac{L_o - L_s}{L_o}\right) \times 100$$

Preferably, the first layer of film (b1) or (b2) and/or the second layer of film (d) is a blown film which has been produced with a blow up ratio of 1:2.5-1:10, preferably 1:4-1:6, and/or with a take-off ratio of 1:2-1:8, preferably 1:3-1:5. Within these ranges, optimal shrinking properties of the films can be created for the application in the multi-layer sealing film. In particular the double bubble procedure is a suitable way of production.

In further embodiments, the first layer of film (b1) or (b2) or the second layer of film (d) is made of a film comprising two or more layers. This allows for different functionalities of the multi-layer sealing film. The film may for example be adapted to the non-woven and the container material regarding seal strength and compatibility, in particular when a tie layer is used as a third layer between two other film layers. By suitable choice of the polymers, it is possible to ascertain that the sealing seam will separate between the film layer and the container when the multi-layer sealing film is removed from the package while the non-woven will not be damaged. This way the formation of lint and particles can effectively be reduced.

In a particularly preferred variant of those functionalities, the first layer of film (b1) or (b2) or the second layer of film (d) is peelable. If the layer of the multi-layer sealing film which is to be sealed against the container is designed as a peelable layer, the container may be easily opened without the formation of lint from the non-woven or particles from the film layer. Moreover, it is possible to adjust the peel force to a level which secures the closure of the container while still allowing a convenient opening. In particular, the peel force may be adapted to the size of the container and consequently the packaged items in view of the resulting weight which rests on the multi-layer sealing film during the sterilization process and the transport.

The peel force may be determined according to DIN 55529:2012-09 in a T-peel test with samples having a width of 15 mm. DIN 55529:2012-09 is a packaging test, particularly for determining a sealing strength of seals made of flexible packaging materials. Seal seam strength is determined by angle peel tests conducted with a tensile strength tester. Two materials connected at the seam are clamped at opposite ends while the seal seam is pulled at a constant speed an angle so that a resultant force curve can be determined.

Generally, a peel force in the range of 6 N/15 mm-10 N/15 mm, known as the "easy peel" range, or 10 N/15 mm-15 N/15 mm, known as the "peel" range, has proven itself to be suitable. The person skilled in the art is well aware of different measures for influencing the peel force. Some examples of influencing parameters are the sealing temperature and the sealing time for the final film and during production of the film the temperature of the melt, the frost line in the bubble, the die gap, the blow up ratio, the take-off ratio, and, of course, the composition and materials.

A design of the first layer of film (b1) or (b2) or the second layer of film (d) as an at least three layer film is advantageous in this case. A core layer of the polymer of choice can then be provided with the peelable layer towards the inside of the packaging and with a layer of strong sealing polymers, like ionomers, metallocene catalyzed polyethylene (LLDPE C6, C8, MDPE, HDPE), or linear low density polyethylene (C4, C6, C8), towards the non-woven layer on the outside of the packaging. As may be required, suitable tie layers can be provided between these layers. This setup ascertains a strong bond of the polymer layer to the non-woven and an easy to open bond to the container which results in the best choice for avoiding lint and particles.

Preferably, the first layer of film (b1) or (b2) or the second layer of film (d) comprises or consists of a layer comprising a polyolefin plastomer, isotactic polybutylene-1, and/or an ethylene propylene copolymer. With these types of polymers, a suitable peeling behavior and peel force can be generated. As customary in the art, they may be used alone or together with a different matrix polymer (for example low density polyethylene) and, as needed, in conjunction with suitable tie layers.

In embodiments, the film of the first layer of film (b1) or (b2) or the second layer of film (d) comprises or is made of polyethylene, polypropylene, polyamide 6, polyethylene terephthalate or their blends and/or copolymers.

In a second aspect, the disclosure relates to a use of a multi-layer sealing film according to the disclosure for steam decontaminated packaging of a container. As has been detailed above, the multi-layer sealing film according to the disclosure has particular advantages when used in conjunction with steam as the decontamination medium.

In a third aspect, the disclosure relates to a packaging for decontaminated packaging of objects comprising a tub, optionally comprising a nest, or a tray, which is sealed with a multi-layer sealing film according to the disclosure.

In preferred embodiments of the packaging, the tub or tray comprises or is made of polystyrene, high impact polystyrene, polyethylene, polycarbonate, polyethylene terephthalate-glycol copolymer, polypropylene, or polyvinyl-chloride or their blends and/or copolymers.

In a fourth aspect, the disclosure relates to a use of a packaging according to the disclosure for decontaminated packaging of objects for medical, pharmaceutical or cosmetic uses.

DETAILED DESCRIPTION OF THE DISCLOSURE

Figure 1:
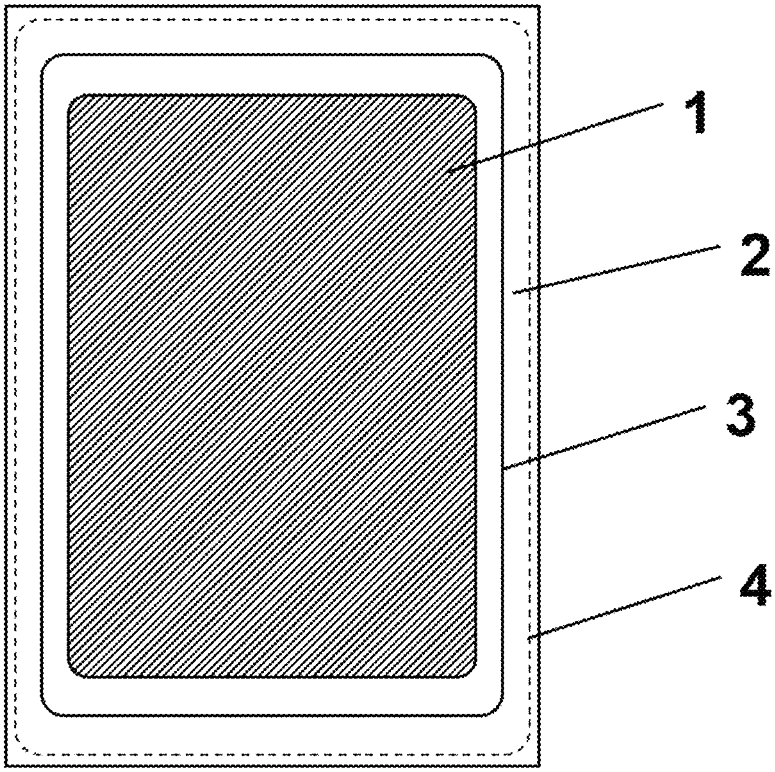
FIG. 1 is a top-down view of a multi-layer sealing film according to the disclosure having a cut-out region when viewed from the inside of the packaging.

A first example of a multi-layer sealing film according to the disclosure is shown in FIG. 1 which is a view from inside-out of the packaging to be able to see all layers. The lowest layer in the figure (the crosshatched area) is the layer of a selectively permeable non-woven 1) which is only partially visible through the layers above. Its size is equal to the size of the layers above, i.e. it extends to the surrounding rectangle in FIG. 1. In this example, a layer of Tyvek® 1073B has been used.

The first layer of film 2, which is sealed to the layer of a selectively permeable non-woven 1 by the sealing seam 3, has been made using a layer of high-density polyethylene and a tie layer of an ionomer arranged on the side facing the container. The sealing seam 3 is arranged around the periphery of the window-like cut-out region through which the layer of a selectively permeable non-woven 1 is visible in the figure. The dashed line marks the sealing seam area 4 where the sealing seam will be placed when sealing the multi-layer sealing film to the container, i.e. the line essentially is identical to the contours of the rim of the opening of the container.

The size of the multi-layer sealing film, which is shown in FIG. 1 as a single sheet, corresponds to the size of the container. Hence, the sealing seam area 4 is placed near the outer edges of the multi-layer sealing film and outside of the sealing seam 3. For the alternative design of the multi-layer sealing film, the positions of sealing seam 3 and sealing seam area 4 would be switched and the size of the multi-layer sealing film would have to be made correspondingly larger. If used from a roll instead of pre-cut sheets, either on the large or small sides of the depicted sheet the next sheet will follow on the roll and must be cut off during the sealing process.

Not shown in FIG. 1 is the container which would complete the packaging. In this example, it was a tray made of polypropylene. For packing, for example, vials, the vials are placed into the tray, the multi-layer sealing film is positioned on the tray with the sealing seam area 4 on the rim of its opening and then sealed onto the tray. Thereafter, the packaging may be put in a rack with the multi-layer sealing film facing downwards and subjected to a steam sterilization process. When opening the packaging, the multi-layer sealing film will separate cleanly from the tray without tearing filaments out of the non-woven.

Figure 2:
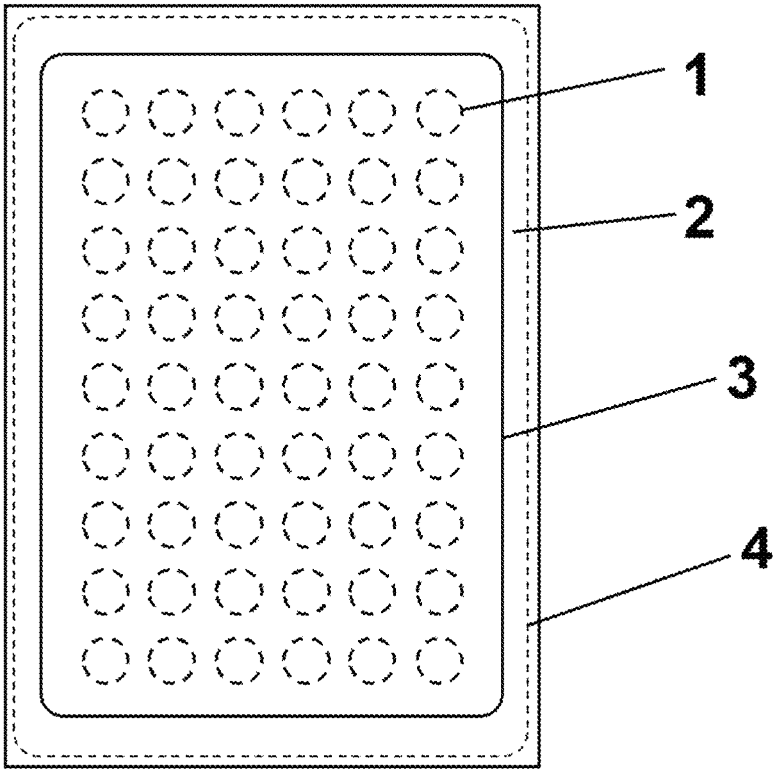
FIG. 2 is a top-down view of a multi-layer sealing film according to the disclosure having a cut pattern when viewed from the inside of the packaging.

In FIG. 2, there is shown another example of a multi-layer sealing film dimensioned as in FIG. 1. It differs from the multi-layer sealing film of the first example in that the first layer of film 2 has no window-like cut-out regions but covers the whole surface of the layer of a selectively permeable non-woven 1 and instead has a cut pattern in the form of circles arranged in an array. Hence, the layer of a selectively permeable non-woven 1 is visible in the figure only through these cuts in the circles the dashes of the circles which consequently have been marked with reference numeral 1. The position of sealing seam 3) and sealing seam area 4) is the same as in the first example.

Further, while the layer of a selectively permeable non-woven 1) is the same Tyvek® 1073B as used in the first example, the first layer of film 2 consists in this example of a three layer blown film with shrink and peel properties. It has a layer of high-density polyethylene followed by a layer of a compound having high-density polyethylene and 10% by weight isotactic polybutylene-1 and a tie layer of an anhydride-modified ethylene vinyl acetate polymer arranged on the side facing the container. The blow up ratio has been 1:4.5 and the take-off ratio 1:3.5.

The container used in this example was a tub made of polystyrene. When the multi-layer sealing film is sealed onto the tub, there exist direct paths between the outer edges of the multi-layer sealing film which do not have any openings in them because the circular cut patterns are arranged in spaced apart rows and columns. This way, the shrink of the multi-layer sealing film which occurs during a steam sterilization process may re-tighten the film sufficiently. If the cut pattern were too dense without closed lines of film between the edges, the resulting effect of tightening may be insufficiently small. The same applies to the variant of the first example. For this type of sealing film, it is, hence, recommended to use several smaller cut-out regions instead of the one large one if it is intended to provide them with the shrinking properties. For example, a 3×2 or 4×3 arrangement of sufficiently spaced apart cut-out regions is a good starting point for the fine-tuning of the effect.

Figure 3:
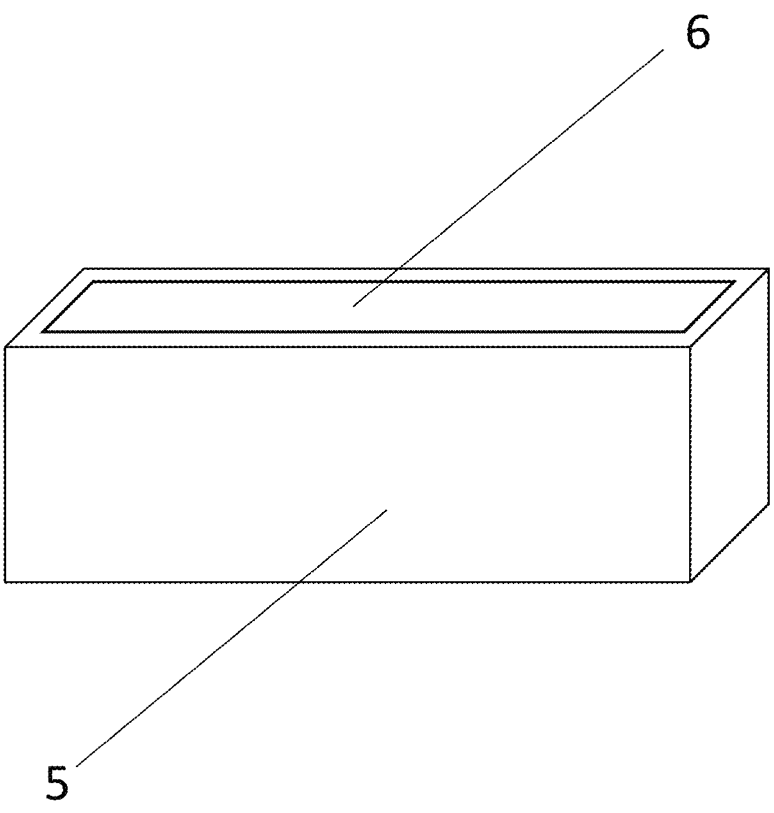
FIG. 3 is a container that is sealable with a multi-layer sealing film according to the disclosure.

FIG. 3 shows a container 5 with an opening 6. The opening 6 can be sealed with a multi-layer sealing film according to the present disclosure.

The invention claimed is:

1. A multi-layer sealing film for gas or vapor decontaminable packaging of a container having an opening to be sealed with the multi-layer sealing film before gas or vapor decontamination, the multi-layer sealing film comprising, in a sequence, from an outside towards an inside of the container:

(a) a layer of a selectively permeable non-woven that is substantially impermeable to microorganisms; and (b1) a first layer of film having one or more predefined cut-out regions within an area of the multi-layer sealing film that is to cover the opening, or (b2) a first layer of film that is substantially impermeable to a gas or vapor of the gas or vapor decontamination, the first layer of film having a first needling, perforation and/or cut pattern within the area of the multi-layer sealing film that is to cover the opening, wherein the layer of a selectively permeable non-woven (a) and the first layer of film (b1) or (b2) are bonded by a sealing seam configured and arranged at least partially subject to and non-overlapping with a sealing seam area for sealing the opening;

(c) an adhesive layer that is activated by an energy transmission and that (i) covers an entire surface of at least one of the layer of a selectively permeable non-woven (a) and the first layer of film (b1) or (b2) or (ii) is arranged in a pattern over the entire surface; and (d) a second layer of film that is substantially impermeable to the gas or vapor of the gas or vapor decontamination, the second layer of film having a second needling, perforation and/or cut pattern that is incongruent with the first needling, perforation and/or pattern, wherein the first layer of film (b1) or (b2) and/or the second layer of film (d) is peelable.

2. The multi-layer sealing film according to claim 1, wherein the energy transmission is at least one energy transmission selected from the group consisting of: heat, UV irradiation, IR irradiation, induction, and microwave irradiation.

3. The multi-layer sealing film according to claim 1, wherein the adhesive layer (c) is a hot melt heat sealable adhesive system containing additives that are responsive to the energy transmission.

4. The multi-layer sealing film according to claim 1, wherein the selectively permeable non-woven is a flash spun plexifilamentary film-fibril structure or a spunbonded very fine filaments non-woven.

5. The multi-layer sealing film according to claim 1, wherein the selectively permeable non-woven is made of high-density polyethylene (HDPE), polypropylene (PP), or polyethylene terephthalate (PET).

6. The multi-layer sealing film according to claim 1, wherein the first layer of film (b1) or (b2) and/or the second layer of film (d) is a blown film produced with a blow up ratio of 1:2.5-1:10 and/or with a take-off ratio of 1:2-1:8.

7. The multi-layer sealing film according to claim 1, wherein the first layer of film (b1) or (b2) and/or the second layer of film (d) is made of a film comprising two or more layers.

8. The multi-layer sealing film according to claim 1, wherein the first layer of film (b1) or (b2) or the second layer of film (d) is a layer comprising polyolefin plastomer, isotactic polybutylene-1, and/or an ethylene propylene copolymer.

9. The multi-layer sealing film according to claim 1, wherein the first layer of film (b1) or (b2) or the second layer of film (d) is a layer consisting of polyolefin plastomer, isotactic polybutylene-1, or an ethylene propylene copolymer.

10. The multi-layer sealing film according to claim 1, wherein the first layer of film (b1) or (b2) or the second layer of film (d) is a layer comprising polyethylene, polypropylene, polyamide 6, polyethylene terephthalate, or blends and/or copolymers thereof.

11. The multi-layer sealing film according to claim 1, wherein the multi-layer sealing film consists of: the layer of a selectively permeable non-woven (a) and the first layer of film (b1) or (b2).

12. The multi-layer sealing film according to claim 1, wherein the first layer of film (b1) or (b2) and/or the second layer of film (d) have monoaxial or biaxial heat shrinkability.

13. The multi-layer sealing film according to claim 12, wherein the monoaxial or biaxial heat shrinkability in one or both directions is 20%-55% when determined according to DIN 55543-4:2017-03.

14. A method comprising:

providing a multi-layer sealing film, the multi-layer sealing film comprising, in sequence:

(a) a layer of a selectively permeable non-woven that is substantially impermeable to microorganisms; and (b1) a first layer of film having one or more predefined cut-out regions within an area of the multi-layer sealing film that is to cover an opening of a container, or (b2) a first layer of film that is substantially impermeable to a gas or vapor of a gas or vapor decontamination process, the first layer of film having a first needling, perforation and/or cut pattern within the area of the multi-layer sealing film that is to cover the opening, wherein the layer of the selectively permeable non-woven (a) and the first layer of film (b1) or (b2) are bonded by a sealing seam configured and arranged at least partially subject to and non-overlapping with a sealing seam area for sealing the opening;

(c) an adhesive layer that is activated by an energy transmission and that (i) covers an entire surface of at least one of the layer of a selectively permeable non-woven (a) and the first layer of film (b1) or (b2) or (ii) is arranged in a pattern over the entire surface; and (d) a second layer of film that is substantially impermeable to the gas or vapor of the gas or vapor decontamination, the second layer of film having a second needling, perforation and/or cut pattern that is incongruent with the first needling, perforation and/or pattern, wherein the first layer of film (b1) or (b2) and/or the second layer of film (d) is peelable;

sealing the opening of the container with the multi-layer sealing film so that the layer of the selectively permeable non-woven (a) is away from an inside of the container to form a packaging; and steam decontaminating the packaging.

15. A packaging for decontaminated packaging of objects comprising:

a tub having an opening sealed with a multi-layer sealing film, wherein the multi-layer sealing film comprises, in sequence from an outside towards an inside of the tub:

(a) a layer of a selectively permeable non-woven that is substantially impermeable to microorganisms; and (b1) a first layer of film having one or more predefined cut-out regions within an area of the multi-layer sealing film that covers the opening, or (b2) a first layer of film that is substantially impermeable to a gas or vapor of the gas or vapor decontamination, the first layer of film having a first needling, perforation and/or cut pattern within the area of the multi-layer sealing film that covers the opening, wherein the layer of the selectively permeable non-woven (a) and the first layer of film (b1) or (b2) are bonded by a sealing seam configured and arranged at least partially subject to and non-overlapping with a sealing seam area for sealing the opening;

(c) an adhesive layer that is activated by an energy transmission and that (i) covers an entire surface of at least one of the layer of a selectively permeable non-woven (a) and the first layer of film (b1) or (b2) or (ii) is arranged in a pattern over the entire surface; and (d) a second layer of film that is substantially impermeable to the gas or vapor of the gas or vapor decontamination, the second layer of film having a second needling, perforation and/or cut pattern that is incongruent with the first needling, perforation and/or pattern, wherein the first layer of film (b1) or (b2) and/or the second layer of film (d) is peelable.

16. The packaging according to claim 15, wherein the tub comprises a tray or nest.

17. The packaging according to claim 15, wherein the tub comprises polystyrene, high impact polystyrene, polyethylene, polycarbonate, polyethylene terephthalate glycol copolymer, polypropylene, polyvinyl chloride, and blends and/or copolymers thereof.

* * * * *